(12) United States Patent
Milne et al.

(10) Patent No.: US 7,683,625 B2
(45) Date of Patent: Mar. 23, 2010

(54) ELECTROMAGNETIC SURVEYING (75) Inventors: James Milne, Aberdeen (GB); Jennifer Rust, Aberdeen (GB); Chris Sykes, Aberdeen (GB); Mark Bennett, Guildford (GB)

(73) Assignee: OHM Limited, Bridge of Don, Aberdeen (GB)

( * ) Notice: Subject to any disclaimer, the term of this patent is extended or adjusted under 35 U.S.C. 154(b) by 56 days.

(21) Appl. No.: 11/169,381

(22) Filed: Jun. 29, 2005

(65) Prior Publication Data

US 2006/0001428 A1    Jan. 5, 2006

(30) Foreign Application Priority Data

Jul. 2, 2004    (GB) ................................ 0414903.5

(51) Int. Cl.
    *G01V 3/00*    (2006.01)
(52) U.S. Cl. .................................................... 324/365
(58) Field of Classification Search ......... 324/332–343, 324/360, 365; 363/34, 35, 36, 37; 361/143, 361/152; 343/709, 719; 335/296; 331/71
    See application file for complete search history.

(56) References Cited

U.S. PATENT DOCUMENTS

| | | | |
|---|---|---|---|
| 3,164,772 A | | 1/1965 | Hicks |
| 3,852,654 A | | 12/1974 | Gyugyi et al. |
| 4,410,809 A | | 10/1983 | Furuichi et al. |
| 4,691,263 A | * | 9/1987 | Kenny et al. .................. 361/58 |
| 4,855,912 A | * | 8/1989 | Banavar et al. ................ 702/7 |
| 4,897,605 A | * | 1/1990 | Cox et al. ................... 324/341 |
| 5,053,682 A | * | 10/1991 | Shoda et al. ................. 315/223 |
| 5,566,643 A | | 10/1996 | Charter et al. |
| 5,646,498 A | | 7/1997 | Lipo et al. |
| 6,057,674 A | | 5/2000 | Bangerter |
| 6,134,126 A | * | 10/2000 | Ikekame et al. ............... 363/39 |
| 6,177,651 B1 | | 1/2001 | Reynolds et al. |
| 6,188,221 B1 | | 2/2001 | Van De Kop et al. |
| 6,198,642 B1 | | 3/2001 | Kocieki |

(Continued)

FOREIGN PATENT DOCUMENTS

DE         3425414         10/2006

(Continued)

OTHER PUBLICATIONS

S. Constable and S. Cox, "Marine controlled-source electromagnetic sounding 2. The Pegasus Experiment" j. Geophys. Res 101 (1996) pp. 5519-5530.

(Continued)

*Primary Examiner*—Kenneth J Whittington
(74) *Attorney, Agent, or Firm*—Renner, Otto, Boisselle & Sklar, LLP (57) ABSTRACT A submersible electromagnetic (EM) field generator for seafloor electromagnetic surveying comprising an AC to DC converter operable to generate a DC output from an AC input and a switching module operable to generate a waveform driving signal by selectively switching the DC output. The EM field generator also comprises an antenna that is operable to generate an EM field in response to the waveform driving signal. This design approach of using a switched DC source allows square or rectangular wave EM signals to be generated which have sharp transition characteristics and which are substantially independent of the AC input characteristics.

36 Claims, 5 Drawing Sheets

U.S. PATENT DOCUMENTS

| | | | |
|---|---|---|---|
| 6,278,622 B1 * | 8/2001 | Shimazaki et al. | 363/37 |
| 6,288,919 B1 | 9/2001 | Jain | |
| 6,339,333 B1 | 1/2002 | Kuo | |
| 6,618,235 B1 | 9/2003 | Wagoner et al. | |
| 6,628,119 B1 | 9/2003 | Eidesmo et al. | |
| 6,717,411 B2 | 4/2004 | Ellingsrud et al. | |
| 6,940,735 B2 | 9/2005 | Deng et al. | |
| 7,109,717 B2 * | 9/2006 | Constable | 324/337 |
| 2002/0171560 A1 * | 11/2002 | Ciglenec et al. | 340/853.1 |
| 2004/0252585 A1 * | 12/2004 | Smith et al. | 367/66 |
| 2005/0264294 A1 | 12/2005 | Constable | |
| 2006/0038570 A1 | 2/2006 | Constable | |
| 2006/0255809 A1 * | 11/2006 | Johnstad et al. | 324/337 |

FOREIGN PATENT DOCUMENTS

| | | |
|---|---|---|
| DE | 4138958 | 10/2006 |
| GB | 1 284 630 | 10/1970 |
| GB | 2 022 943 A | 6/1979 |
| GB | 2 381 137 | 4/2003 |
| GB | 2 390 904 | 1/2004 |
| WO | 2005/117326 A2 | 12/2005 |
| WO | WO2005017326 * | 12/2005 |

OTHER PUBLICATIONS

XP 002234785, Feb. 2001.

N. Mohan et al., "Power electronics; converters, applications and design", $3^{rd}$ edition, pp. 188-192.

* cited by examiner

ELECTROMAGNETIC SURVEYING

BACKGROUND OF THE INVENTION

The present invention relates to electromagnetic surveying. In particular, the present invention relates to the generation of electromagnetic (EM) fields when surveying for hydrocarbon reservoirs or other formations identifiable by their electrical properties.

Determining the response of the sub-surface strata within the earth's crust to electromagnetic fields is a valuable tool in the field of geophysical research. The geological processes occurring in thermally, hydrothermally or magmatically active regions can be studied. In addition, electromagnetic sounding techniques can provide valuable insights into the nature, and particularly the likely hydrocarbon content, of subterranean reservoirs in the context of subterranean oil exploration and surveying.

Traditionally seismic techniques are used during oil-exploration expeditions to identify the existence, location and extent of reservoirs in subterranean rock strata. Whilst seismic surveying is able to identify such structures, the technique is often unable to distinguish between the different possible compositions of pore fluids within them, especially for pore fluids which have similar mechanical properties.

Whilst oil-filled and water-filled reservoirs are mechanically similar, they do possess significantly different electrical properties, which can be discriminated by active EM surveying. Active EM surveying is based on generating an EM field with a suitable EM source positioned near to the seafloor. Energy from the source then propagates by diffusion through the subterranean strata and is measured by remote receivers arranged at or near the seafloor. The term "active" is used to differentiate from the passive EM technique of magneto-telluric (MT) surveying which measures the response of subterranean strata to EM fields generated naturally in the earth's upper atmosphere.

The standard EM source used for active EM is an electric dipole antenna streamed from a towed submersible often referred to as an underwater towed vehicle (UTV) or a remote operated vehicle (ROV), the latter term being used in the following. The electric dipole is driven by a suitable electrical waveform supplied from the survey vehicle, i.e. from topside. High power is important for the EM source since the diffusive EM signal that propagates through the subterranean strata is strongly attenuated resulting in the signals received at the detectors being weak. For the antenna to generate a powerful signal, the ROV needs to receive a high power signal from topside through a transmission cable. The normal difficulties of transmitting a high power electric signal along a cable then apply, such as transmission loss, timing drift, impedance matching and so forth.

A known design [1] is to use an AC generator and a step-up transformer topside and convert the electrical waveform into a high voltage/low current signal for transmission from topside to ROV, thereby reducing transmission losses along the cable. Following transmission to the ROV, the high voltage/low current signal is converted back into a low voltage/high current signal which is then used to drive the streamed antenna. The streamed antenna comprises two electrodes spaced along the length of the antenna and which are separated from each other by seawater when submerged. However, although the seawater provides a path for current flow between the electrodes, it also provides a load with an inherently high inductance. In practice, this has proved problematic, since the high inductance of the load causes the generation of a back EMF when the current is switched. The effect of the back EMF is to produce voltage transients that can be damaging to components within the waveform driving signal source.

Another significant design criterion for the ideal active EM source is the waveform it is capable of producing. The ideal EM source would be capable of generating any arbitrary functional form. In practice, a square wave (or rectangular wave) is an important profile to be able to produce. This is of interest not only for the fundamental frequency, but also for the higher order harmonics that arise, as will be understood from the Fourier expansion of a square wave. In other words, a square wave source can be exploited as a multi-frequency source. It is therefore important to be able to produce a clean square wave with well defined amplitude and timing specifications.

The known cyclo-converter device [1] operates by performing full-wave rectification of an input AC waveform over a predetermined number of cycles to produce a frequency doubled positive polarity full-wave rectified waveform. After the positive polarity full-wave rectified waveform has been produced, the rectification polarity is reversed for a further predetermined number of cycles to produce a frequency doubled negative polarity full-wave rectified waveform. Together the positive and negative polarity full-wave rectified waveforms provide an approximation to a square-wave waveform.

Periodic switching of the rectification polarity can be performed at half-wavelength multiples of the input AC to provide a square-wave approximation waveform having a fundamental frequency corresponding to the input AC waveform, by detecting and counting the number of zero crossings that occur in the input AC waveform. Such a square-wave approximation waveform has two main frequency components, namely: a lower fundamental frequency component, which corresponds to the frequency of the polarity switching, and a higher frequency component, which is a multiple of the input AC signal frequency.

Through extensive and successful use, the limitations of the known cyclo-converter design have become apparent. Variations in phase and amplitude of the AC signal generated by the antenna are undesirable. These problems arise in large part due to drift and variable attenuation during the transmission of the AC signal from topside to ROV. The timing of the polarity switching at the ROV is dependant on the phase stability of the AC signal, and this can be degraded by inductive and capacitive effects in the transmission from topside. For example, degradation of the AC signal can produce erroneous zero-crossing points or cause non-detection of a real zero-crossing point, which may in turn result in a polarity switching event being triggered at an incorrect instant. Thus, we have concluded that effective operation of the cyclo-converter requires good stability control of the AC signal supplied to it and, as far as possible, mitigating any instability effects by additional design features in the ROV. Furthermore, the transition period of the square-wave approximation from positive to negative polarity, and vice versa, is dependant on the frequency of the supplied AC. This has led us to design specialist high frequency generation equipment in order to drive the cyclo-converter rapidly so as to reduce the transition period.

SUMMARY OF THE INVENTION

According to a first aspect of the present invention, there is provided a submersible electromagnetic (EM) field generator for seafloor electromagnetic surveying. The submersible electromagnetic field generator comprises an AC to DC converter operable to generate a DC output from an AC input, a switching module operable to generate a waveform driving signal by selectively switching the DC output, and an antenna operable to generate an EM field in response to the waveform driving signal.

By generating the waveform driving signal from a DC output, not only are approximated square waves having sharp transition characteristics provided, but the waveform driving signal is substantially independent of the AC input characteristics. Moreover, with this design the submersible electromagnetic field generator in the ROV does not need to be driven by a specialized high frequency power source at the topside. For example, the ROV-based field generator can be driven by a standard marine 50/60 Hz power supply unit arranged topside.

According to a second aspect of the present invention, there is provided an electromagnetic (EM) field generation system for seafloor electromagnetic surveying. The EM field generation system comprises a submersible electromagnetic field generator according to the first aspect of the present invention, a power source operably coupled to the AC to DC converter of the electromagnetic field generator, and a control module operably coupled to a controller of the submersible electromagnetic field generator. The control module is operable to control the waveform driving signal that drives the antenna.

The control module may be located in a surface vehicle and used remotely to control the EM field generated by the submersible electromagnetic field generator. This in turn enables the generation of subsea EM fields having known and/or variable profiles and allows the generation of the EM fields to be synchronized with the surface-located control module.

In various embodiments, the control module is itself operably coupled to a GPS receiver which allows a topside controller to co-ordinate both the generation of EM fields and measurement of the effects of those EM fields on subsea strata. The topside controller can activate the control module and obtain time-stamped EM survey measurement data synchronized to absolute time as indicated by a GPS transmitter.

According to a third aspect of the present invention, there is a method of generating an electromagnetic (EM) field for seafloor electromagnetic surveying. The method comprises providing an AC signal, generating a DC signal from the AC signal, generating a waveform driving signal by switching the DC signal, and driving an electric dipole with the waveform driving signal to generate the EM field.

BRIEF DESCRIPTION OF THE DRAWINGS

For a better understanding of the invention, and to show how the same may be carried into effect, reference is now made by way of example to the accompanying drawings in which.

DETAILED DESCRIPTION

Figure 1:
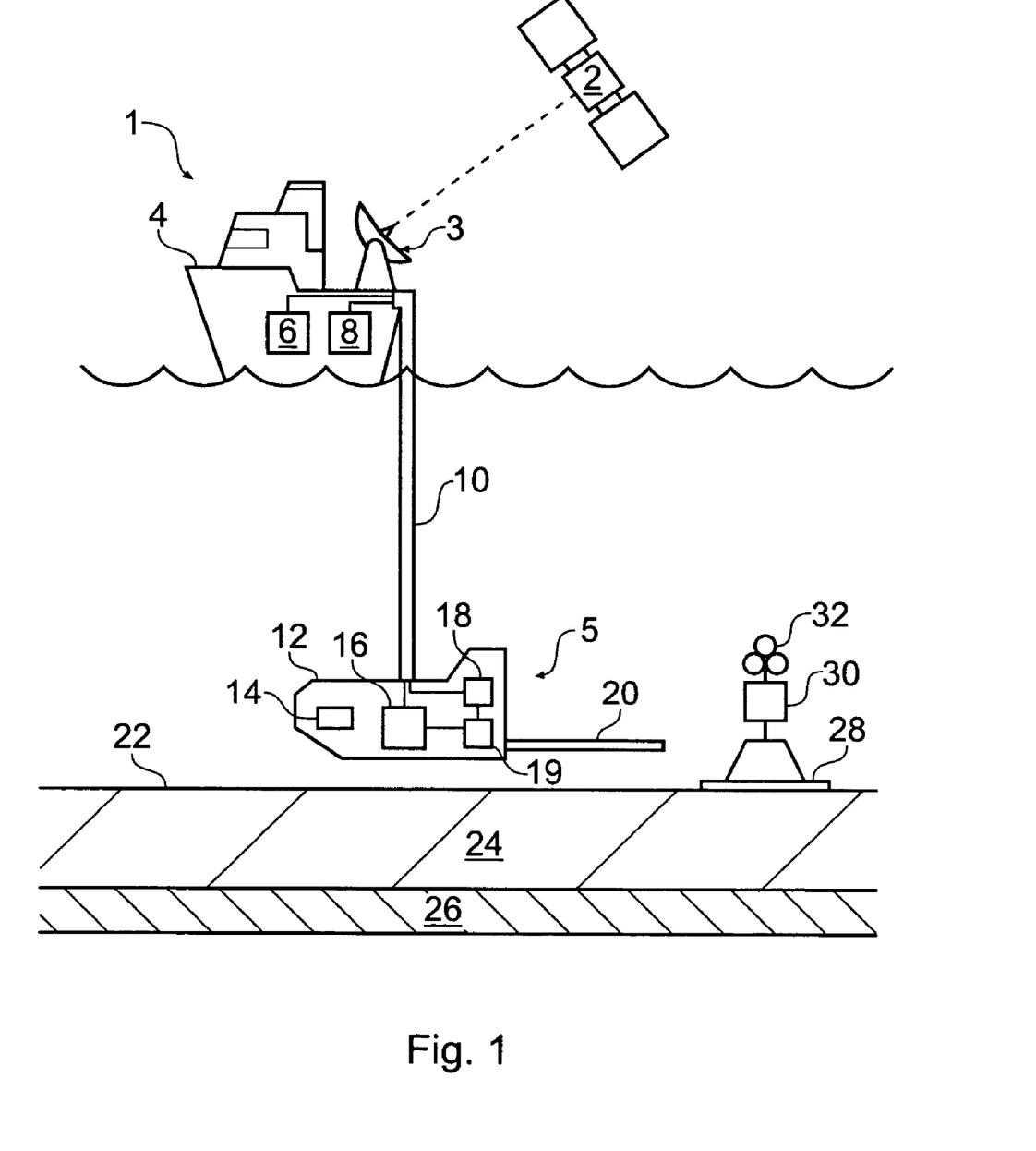
FIG. 1 shows a seafloor surveying system comprising a submersible EM field generator according to an embodiment of the present invention.

FIG. 1 shows a seafloor surveying system 1 comprising a submersible EM field generator 5. The EM field generator 5 is carried by a submersible vehicle 12 that is towed by a surface vehicle 4. The submersible vehicle 12 remains at an approximately constant distance above the seafloor 22. This separation is achieved by using an echo location module 14 to measure the distance of the submersible vehicle 12 from the seafloor 22 and to relay information regarding the measured separation to the surface vehicle 4. The depth of the submersible vehicle 12 may then be adjusted by reeling-in or letting-out an appropriate length of the umbilical cable 10, or otherwise (for example, by controlling the submersible vehicle 12 with on board thrusters and/or hydrodynamic surfaces).

Power and control signals are transmitted from the surface vehicle 4 to the submersible vehicle 12 through the umbilical cable 10, which also provides the mechanical link between the surface vehicle 4 and the submersible vehicle 12. These power and control signals are used by the EM field generator 5 to generate an EM field that penetrates through the seafloor 22 into the subsea strata 24, 26.

An EM field signal is produced by interaction of the EM field with the subsea strata 24, 26. This EM field signal carries information relating to the composition of the subsea strata 24, 26, which can be used to identify the type of fluid contained in a fluid-bearing subsea strata 26. A component of the EM field signal is detected by one or more receiving antennae 28 located some distance from the submersible vehicle 12. Direct EM field transmission between the EM field generator 5 and the receiving antennae 28 is strongly attenuated by the highly conductive seawater, and where the separation is more than a few hundred meters this component's contribution to the received EM field signal is negligible.

Typically, an array or grid of receiving antennae 28 are provided, each laid at a respective predetermined location on the seafloor 22. Each receiving antennae 28 is operably coupled to a respective remote instrument package 30 and a remotely deployable flotation device 32. The remote instrument packages 30 record data corresponding to the EM field signal detected by the receiving antennae 28. Clocks in the remote instrument packages 30 are synchronized to a master clock (not shown) on the surface vehicle before being deployed on the seafloor 22. Once the EM survey is complete, a remote activation signal is sent from the surface vehicle 4 to the deployable flotation devices 32, causing them to deploy and to lift the remote instrument packages 30 to the sea surface for recovery. Once recovered, data from the remote instrument packages 30 can be analyzed at leisure.

The EM field generator 5 comprises an AC to DC converter 18, a switching module 19, and an antenna 20. The AC to DC converter 18 provides a DC output to the switching module 19. The switching module 19 generates a waveform driving signal by switching various DC levels to the antenna 20. For example, a positive DC voltage may be switched to the antenna 20 followed by a zero voltage level in order to approximate one cycle of a square-wave-like waveform driving signal.

An AC input is transmitted from a power source 6 on the surface vehicle 4 to the AC to DC converter 18 of the EM field generator 5 through the umbilical cable 10. For example, the power source 6 may produce a 50 or 60 Hz three phase sine wave having a peak-to-peak voltage of 4500V. Use of high-voltage AC enables efficient power transfer to be obtained between the power source 6 and the EM field generator 5. Moreover, the power source 6 can be a three-phase power unit with all three power phases being transmitted through the umbilical cable 10. Use of such a three-phase power supply not only provides improved power conversion efficiency, but it can also be used to provide a lower-ripple DC output from an AC to DC converter 18 that would be constructed using fewer components. Further improvements in reducing ripple could be made by using more than three phases.

Control signals are generated by a control module 8 located in the surface vehicle 4 and are transmitted through a fiber optic link in the umbilical cable 10 to a controller 16 located in the submersible vehicle 12. Use of a fiber optic link is advantageous as it provides only a small constant transmission latency time between generation of the control signals at the surface vehicle 4 and their reception by the controller 16. The control module 8 is operably coupled to a GPS receiver 3. The GPS receiver 3 receives GPS timing signals transmitted from a satellite-based GPS transmitter 2. Based on those GPS timing signals and internal electronics, the control module 8 can produce timing signals including a high frequency clock signal (e.g. at 1024 Hz) and a lower frequency clock signal (e.g. a pulse or burst signal transmitted every minute). The clock signals are transmitted to the controller 16 by the control module 8.

By using the control module 8 with a GPS receiver 3, the controller 16 can be operated remotely in synchronization to produce waveform driving signals at known times in relation to the GPS timing signals. Additionally, data gathering can take place through the controller 16, and data may be time-stamped at the point of data gathering on the submersible vehicle 12 with accurate time stamps generated against GPS time. Further, the EM field signal may be modulated to include a time-stamp signal that indicates the absolute time at which the EM field signal was generated, thereby reducing the need for the remote instrument packages 28 to include accurate clocks synchronized to the control module 8 located in the surface vehicle 4. The time-stamp signal can be recorded by the remote instrument packages 28 and subsequently used when analyzing data to identify the type of fluid in a fluid-bearing strata 26.

It will be understood that although particular reference to GPS has been made for convenience, other wireless transmitted clock signals could be used instead if these are available, or become available in the future. These may be from terrestrial beacons or satellite based. For example, for inshore waters, mobile telephony signals may be used for the time base.

In addition, the control module 8 may transmit command signals to the controller 16. The command signals instruct the controller 16 to operate the switching module 19 to produce various waveform driving signals. For example, the command signals can select particular waveform driving signals having various different frequencies, mark-to-space ratios, amplitudes, waveform profiles, etc.

Figure 2:
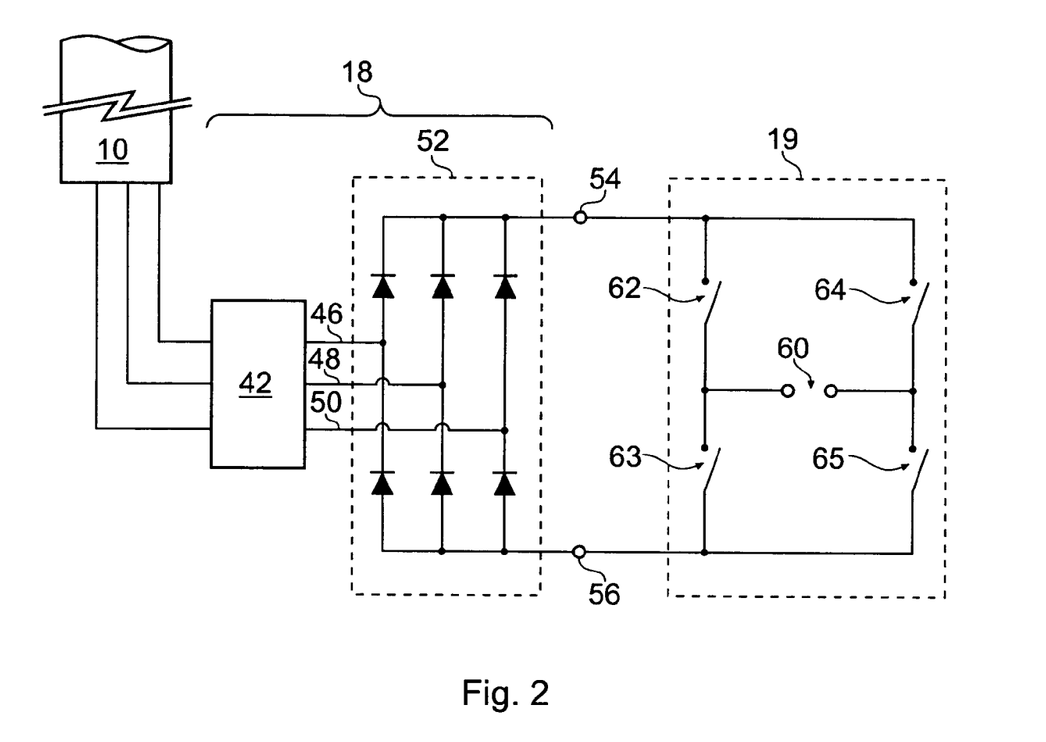
FIG. 2 shows an AC to DC converter and a switching module for use in a submersible EM field generator according to an embodiment of the present invention.

FIG. 2 shows an AC to DC converter 18 and a switching module 19 for use in a submersible EM field generator 5. Three-phase power (e.g. at 4500V) is supplied to the AC to DC converter 18 through the umbilical cable 10. The AC to DC converter 18 rectifies the three-phase input to produce dual voltage positive and negative DC signals on bus bars 54 and 56. The DC signals produced on the bus bars 54, 56 are then switched by the switching module 19 to produce a waveform driving signal across the waveform output electrodes 60.

The AC to DC converter 18 comprises a three phase step-down transformer 42 and a bridge rectifier 52. Three phase power is supplied from the umbilical cable 10 to the primary windings of the three phase step-down transformer 42. The three phase step-down transformer 42 provides three output phases 46, 48, 50. A reduced voltage AC signal (for example, at 74V) is produced for each of these three output phases 46, 48, 50.

The bridge rectifier 52 comprises three sets each of two diodes, each set comprises two diodes connected in series between the bus bars 54, 56. Each output phase 46, 48, 50 drives a respective diode pair at a connection point between the two diodes. Diodes in a diode pair are alternately driven into a conductive state over a full cycle of the three-phase power supply, thereby generating a positive polarity DC signal at the first bus bar 54 and a negative polarity DC signal at the second bus bar 56.

The switching module 19 comprises a first switch pair 62, 63 and a second switch pair 64, 65 each connected in series between the bus bars 54, 56. Each connection point between the switches in the switch pair provides a waveform output electrode 60. Spike suppression circuitry, e.g. including one or more diodes (not shown), may be used to provide protection for the switches against induced back EMF generated when the switches 62, 63, 64, 65 are operated. In order to generate a waveform driving signal across the waveform output electrodes 60, each of the switches 62, 63, 64, 65 in a switch pair are operated according to a predetermined sequence.

One option is to produce a tri-state waveform driving signal by generating a sequence of forward currents, reverse currents and zero currents between the waveform output electrodes 60. A forward current can be generated by simultaneously closing switch 63 of the first switch pair and switch 64 of the second switch pair, thereby causing a current to flow in a first direction between the waveform output electrodes 60. Zero current is obtained by ensuring that all of the switches 62, 63, 64, 65 are open. A reverse current can be generated by simultaneously closing switch 62 of the first switch pair and switch 65 of the second switch pair, thereby causing a current to flow between the waveform output electrodes 60 in a direction that is opposite to the first direction.

The waveform output electrodes 60 can be connected to a pair of copper electrodes that form an antenna 20. In use, these copper electrodes are used to pass a current through seawater in order to generate an EM field in response to the waveform driving signal. Such an antenna 20 is equivalent to a low resistance and high inductance load.

Figure 3:
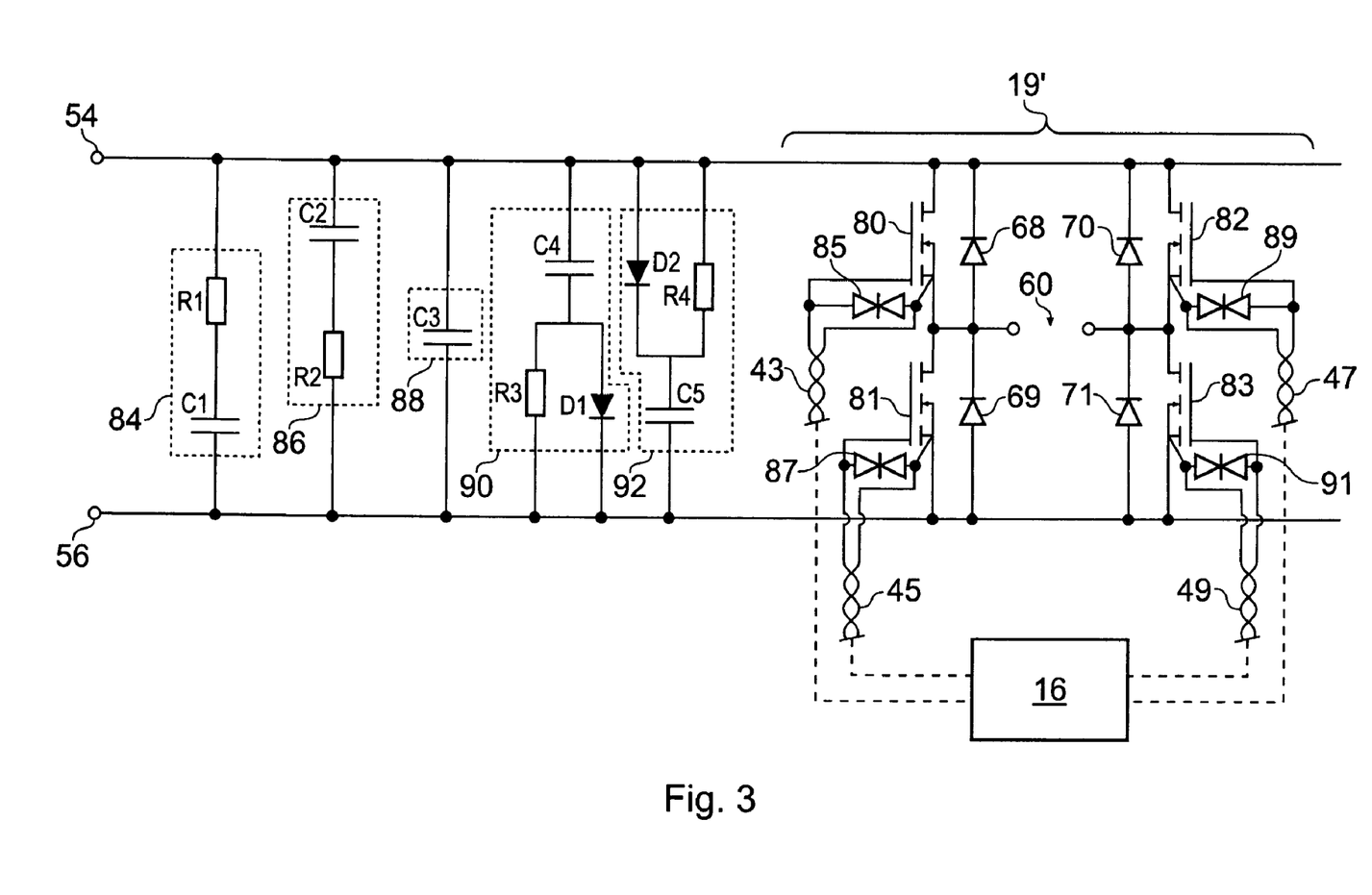
FIG. 3 shows a switching module and transient suppression circuitry for use in a submersible EM field generator according to an embodiment of the present invention.

FIG. 3 shows a switching module 19' and transient suppression circuitry for use in a submersible EM field generator 5. The switching module 19' and transient suppression circuitry may be used in place of the switching module 19, referred to above in connection with FIG. 2.

The switching module 19' comprises a first MOSFET switch pair 80, 81 and a second MOSFET switch pair 82, 83 each connected in series between the bus bars 54, 56. Each connection point between the MOSFET switches in the MOSFET switch pairs provide a waveform output electrode 60. Additionally, each of the MOSFET switches 80, 81, 82, 83 in the MOSFET switch pairs is connected in parallel with a respective diode 68, 69, 70, 71 that provides protection for the MOSFET switches against induced back EMF generated when the MOSFET switches 80, 81, 82, 83 are operated. In order to generate a waveform driving signal across the waveform output electrodes 60, each of the MOSFET switches 80, 81, 82, 83 in a MOSFET switch pair are operated according to a predetermined sequence by a control unit 16 that applies control signals to gate electrodes of the MOSFET switches 80, 81, 82, 83.

The source of each MOSFET switch 80, 81, 82, 83 is connected to a first end of a respective transient voltage suppressor 85, 87, 89, 91 and a respective first lead of a Kelvin source connector pair 43, 45, 47, 49. The gate of each MOSFET switch 80, 81, 82, 83 is connected to a second end of the respective transient voltage suppressor 85, 87, 89, 91 and a respective second lead of a Kelvin source connector pair 43, 45, 47, 49. The Kelvin source connector pairs 43, 45, 47, 49 each connect the source and gate of a respective MOSFET switch 80, 81, 82, 83 to the control unit 16.

The control unit 16 may be a self-contained unit that operates in isolation to produce a predetermined waveform driving signal, or may be remotely commanded, for example, by providing signals from a surface vehicle 4.

Use of solid-state switches, such as, for example, MOSFET switches, has the benefit of providing reliable fast switches. Furthermore, one or more of the MOSFET switches 80, 81, 82, 83 may be replaced by other semiconductor switch devices for example IGBTs insulated gate bipolar transistors) and/or by a plurality of MOSFET switches, or other semiconductor switches, connected in parallel and having common gate electrode connections in order to increase the current throughput capacity of the switches.

The transient suppression circuitry comprises a set of individual transient suppression circuits 84, 86, 88, 90, 92, and is designed to enable the switching module 19' to switch high power signals (e.g. >10 kW) without damaging the MOSFET switches 80, 81, 82, 83. Each of the transient suppression circuits 84, 86, 88, 90, 92 provides a suppression element tuned to a particular frequency, or frequency range determined by the nature of the transient effects. The values used for the components of the transient suppression circuits are determined following an analysis of the characteristics of the power transmission system, such as inductance of the umbilical cable 10, the bus bars 54, 56, etc. Example values used in one design are: $C4=C5=6800$ µF, 385V; $C3=30$ µF, 250V; $C1=C2=1$ µF; $D1=85$ A; $R3=R4=10\Omega$, 500 W; and $R1=1\Omega$, 2 W. It is noted that a plurality of such sets of transient suppression circuits can be provided to improve the overall transient suppression characteristics in the submersible EM field generator 5.

Figure 4:
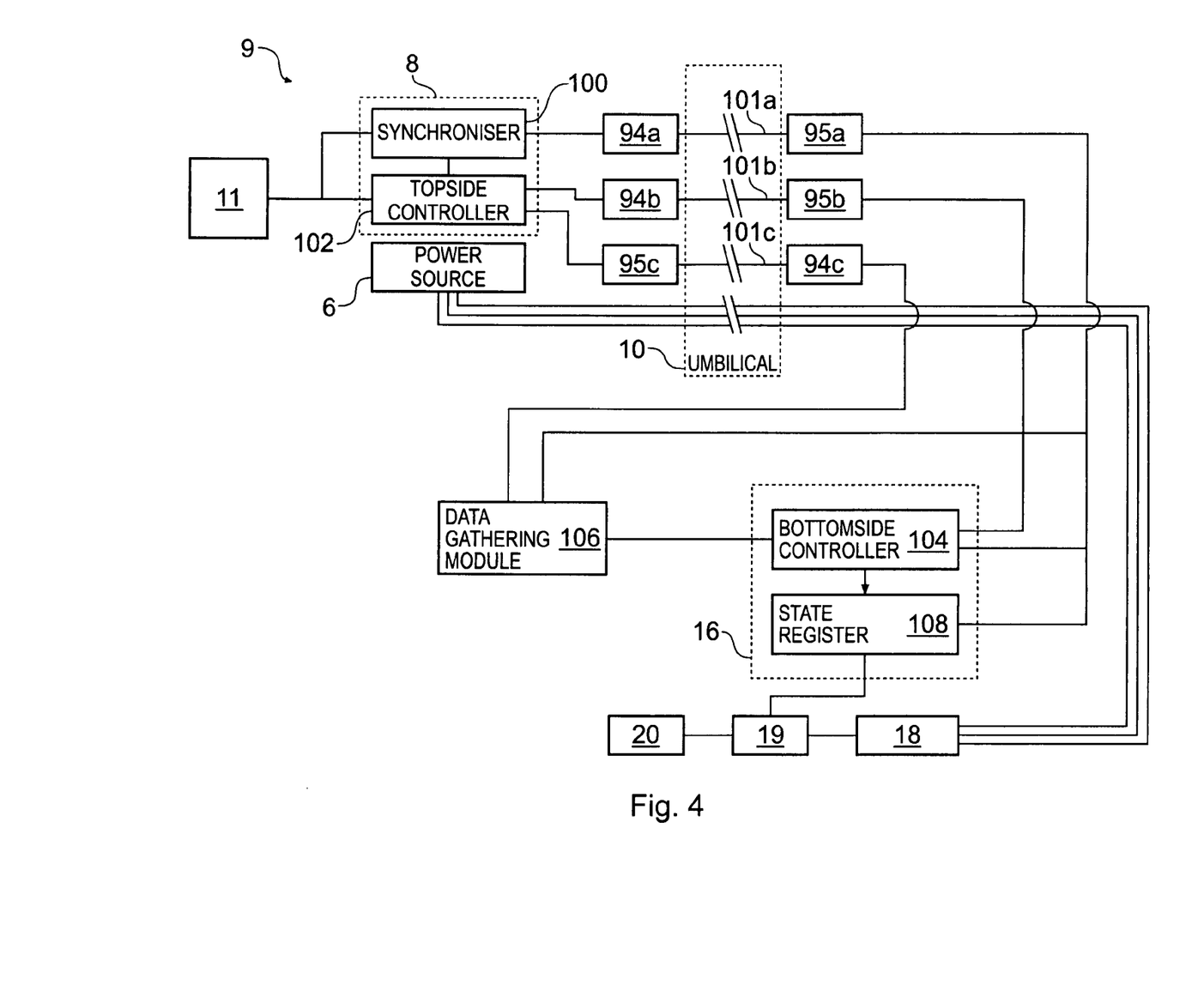
FIG. 4 shows a schematic illustration of an EM field generation system for seafloor electromagnetic surveying according to an embodiment of the present invention.

FIG. 4 is a schematic illustration of an EM field generation system 9 for seafloor electromagnetic surveying. The EM field generation system 9 comprises a power source 6 and a control module 8. A GPS regulated system clock 11 is operably connected to the control module 8. The GPS regulated system clock 11, the power source 6 and the control module 8 are typically located on a surface vehicle 4. The EM field generation system 9 also includes a controller 16, a data gathering module 106, AC to DC converter 18, switching module 19, and antenna 20, typically located on a submersible vehicle 12.

AC power is supplied from the power source 6 to the AC to DC converter 18 though an umbilical cable 10. The AC to DC converter 18 generates one or more DC signals that can then be switched by the switching module 19 to provide a waveform driving signal for driving the antenna 20 to provide an EM field.

The control module 8 comprises a synchronizer 100 and a topside controller 102. The topside controller 102 provides for central control and data logging, and may be provided by one or more computer systems that can optionally be networked together. The topside controller 102 is synchronized to a low frequency clock signal, e.g. every minute and/or second, generated by the GPS regulated system clock 11. The low frequency clock signal is used by the topside controller 102 to synchronize various controller clocks in the EM field generation system 9. Use of the GPS regulated system clock 11 enables the controller clocks to be set to an accurate absolute time.

The GPS regulated system clock 11 is operable to generate a synthesized high frequency clock signal at the synchronizer 100, e.g. at a frequency of between 1 and 5 kHz, such as 1024 Hz. The high frequency clock signal is used as a global master clock by the EM field generation system 9, and ensures a low temporal drift (e.g. $<10^{-20}$) between the various controller clocks between synchronization operations.

The high frequency clock signal is transmitted over a fiber optic link 101a through the umbilical cable 10. The fiber optic link 101a includes a laser diode-based transmitter module 94a and an optical receiver module 95a. The optical receiver module 95a provides the high frequency clock signal to a bottomside controller 104 and a state register 108 that form part of the controller 16. The high frequency clock signal is also provided to the data gathering module 106 by way of the fiber optic link 101a.

The fiber optic link 101b provides a control communications link to the bottomside controller 104. The topside controller 102 communicates with bottomside controller 104 through the fiber optic link 101b, and informs the bottomside controller 104 when it can expect to receive a synchronization signal. The fiber optic link 101b is also used for other control communications, such as programming of the waveform to be generated. The fiber optic link 101b can also be used for returning various data gathered by the bottomside controller 104. The fiber optic links 101b and 101c can be combined into a single link. For example, multiplexing may be used with a single fiber optic.

In normal operation, the timing of the operation of the switching module 19 relies upon the synthesized high frequency clock signal being transmitted to the bottomside controller 104 and the state register 108. The bottomside controller 104 counts clock pulses and, as the appropriate count for a change of switch state of the waveform driving signal approaches, as determined by a programmed waveform, it instructs the state register 108 to change the switching configuration of the switching module 19 at the appropriate time. This provides for accurate switch timing as the state register 108, which is a fixed latency logic device, executes a switching operation with a known latency between the switching operation and the high frequency clock signal.

Without the state register 108, were the bottomside controller 104 to directly operate the switching module 19, consistency of the switching latency would diminish and would on average increase, even if the bottomside controller 104 were to operate in real-time. Additionally, use of the state register 108 enables the bottomside controller 104 to communicate over the fiber optic link 101b, for example using a serial or packet-based communications protocol, without affecting the timing of switching operations.

The synchronizer 100 transmits the high frequency clock signal over the fiber optic link 101a. It is also used to allow the clock of the bottomside controller to be related to GPS time. The topside controller 102 is set to absolute time by the GPS regulated system clock 11, but not to a high accuracy. The topside controller 102 is accurate enough to identify when the next low frequency synchronization signal is due. The topside controller 102 sets the synchronizer 100 to change the high frequency clock signal at the time the low frequency synchronization signal is received. The bottomside controller 104 interprets the change in the high frequency clock signal as an instruction to set instantaneously, or after a predetermined time, its counter to zero. Thus the zero count of the bottomside controller 104 is synchronized with absolute time.

The EM field generation system 9 includes the data gathering module 106. The data gathering module 106 can be configured to collect system data (such as, for example, detailed measurement of a transmitted waveform, diagnostic information etc.) or environmental data (such as, seafloor profile, sea temperature information, water conductivity data, etc.). Data obtained by the data gathering module 106 can be time-stamped using absolute time and/or using the high frequency clock signal. This data may be transmitted to the bottomside controller 104 or to topside controller 102 over the fiber optic link 101c.

When data gathering module 106 data is sampled by the bottomside controller 104 or the topside controller 102, it can be time-stamped immediately using the absolute time provided in accordance with the GPS regulated system clock 11. Absolute time may be tracked by using one or more counters that count high frequency clock cycles and/or synchronization signals, such as those transmitted as changes in the high frequency clock signal. The content of the counters can then be used as a time-stamp. This means that, once acquired and time-stamped, data which is obtained at the bottomside controller 104, which is typically located at a substantial distance from the surface vehicle in a location where data storage space and reliability may be compromised, it can be transmitted over long distances using packet-based protocol transmission, such as Ethernet over a fiber optic cable. Time stamping of the data ensures that any transmission latencies do not compromise the data, for example the inherent variable latency of a packet-based transmission protocol.

Figure 5:
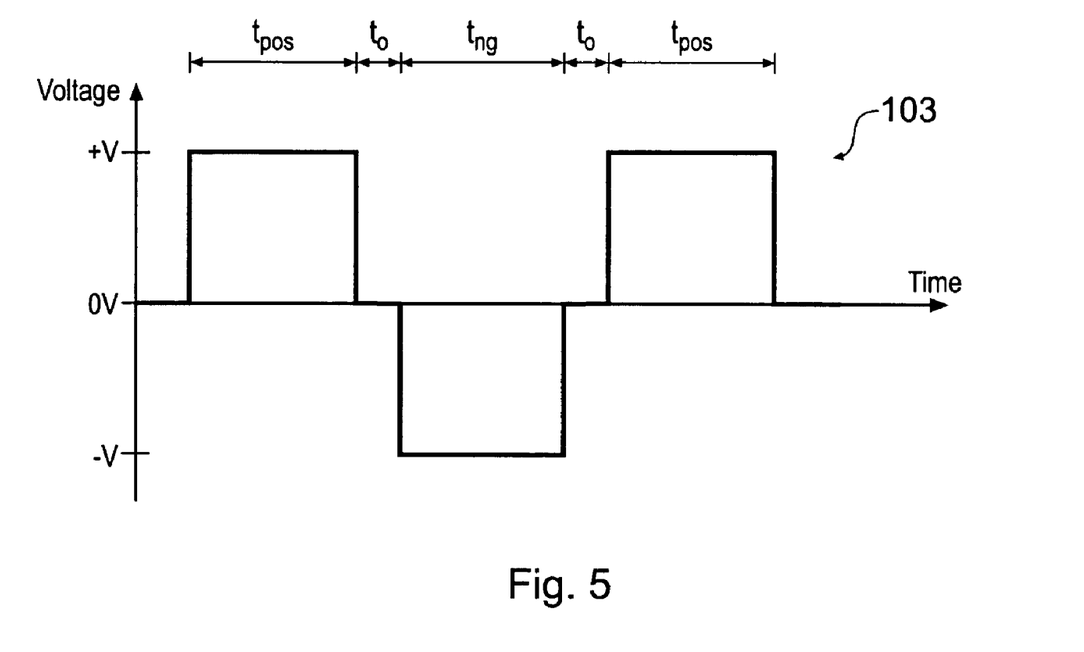
FIG. 5 shows a schematic illustration of a waveform driving signal generated by a submersible EM field generator according to an embodiment of the present invention.

FIG. 5 shows a schematic illustration of a waveform driving signal 103 generated by a submersible EM field generator 5. The waveform driving signal 103 is a tri-state square wave approximation produced by selective switching of two DC signals, +V and −V. One cycle of the waveform is composed of a first period $t_{pos}$ during which the DC signal +V is switched into the output of the EM field generator 5. This is followed by a zero signal period $t_0$ during which neither of the two DC signals are provided at the output of the EM field generator 5. The output of the EM field generator 5 is then switched to −V for a period of $t_{neg}$ until, finally, the cycle is completed with a further zero signal period $t_0$.

Those skilled in the art will understand that the embodiments described herein are merely examples. Many variants and modifications will be apparent. Moreover, those skilled in the art will realize that an antenna is equivalent to any device that embodies an electric dipole, and that the term "square-wave" is not only equivalent to a pure square wave that is switched between only two levels. It will also be understood that the invention is equally applicable to surveying of freshwater, for example large lakes, so that references to seafloor, seawater etc. should not be regarded as limiting.

REFERENCES

[1] GB 2 381 137 A

What is claimed is:

1. A submersible electromagnetic (EM) field generator for seafloor electromagnetic surveying, comprising:
an AC to DC converter operable to generate first and second DC outputs from an AC input as positive and negative DC signals on the first and second DC outputs;
a switching module operable to generate a tristate waveform driving signal of a desired functional form by selective switching of the first and second DC outputs, the switching module comprising a first switch pair and a second switch pair, each connected in series between the first and second DC outputs, first and second waveform output electrodes being provided at connection points between each switch pair;
an antenna formed by first and second antenna electrodes connected to the first and second waveform output electrodes respectively, wherein the antenna electrodes are spaced apart along the length of the antenna and separated from each other by seawater when submerged, wherein said selective switching of the first and second DC outputs switches the DC outputs to the antenna to pass a current through the seawater between the antenna electrodes in order to generate an EM field in response to the waveform driving signal that follows the desired functional form defined by said selective switching; and
a controller that is operable to control selective switching of the switching module so as to generate the tristate waveform driving signal.

2. The submersible electromagnetic field generator according to claim 1, wherein the AC to DC converter is operable to generate the DC outputs from a three-phase AC input.

3. The submersible electromagnetic field generator according to claim 1, wherein the first and second switch pairs comprise semiconductor switches.

4. The submersible electromagnetic field generator according to claim 3, wherein the semiconductor switches are MOSFETs or IGBTs.

5. The submersible electromagnetic field generator according to claim 3, wherein each semiconductor switch has a transient voltage suppressor connected between its source and gate.

6. The submersible electromagnetic field generator according to claim 1, further comprising surge protection circuitry.

7. The submersible electromagnetic field generator according to claim 6, wherein the surge protection circuitry comprises one or more diodes.

8. The submersible electromagnetic field generator according to claim 7, wherein each of the switches is connected in parallel with a respective one of the diodes.

9. The submersible electromagnetic field generator according to claim 6, wherein the surge protection circuitry further comprises a set of transient suppression circuits, each providing suppression tuned to a particular frequency or frequency range.

10. The submersible electromagnetic field generator according to claim 9, wherein the transient suppression circuits have capacitors, diodes and/or resistors with values selected according to their respective particular frequency or frequency range.

11. The submersible electromagnetic field generator according to claim 1, wherein the controller is operable to receive an external synchronisation signal and, in response thereto, to control the operation of the switching module so as to start generation of the waveform driving signal.

12. The submersible electromagnetic field generator according to claim 1, wherein the controller is operable to receive an external command signal and to control the switching module to generate one of a plurality of predetermined waveform driving signals in dependence upon the external command signal.

13. The submersible electromagnetic field generator according to claim 1, further operable to receive an external clock signal.

14. The submersible electromagnetic field generator according to claim 13, wherein the switching module is operable to generate the waveform driving signal in synchronisation with the external clock signal.

15. The submersible electromagnetic field generator according to claim 1, further comprising a data gathering module.

16. The submersible electromagnetic field generator according to claim 15, wherein the data gathering module is further operable to transmit data gathered by the data gathering module from a submersible vehicle to topside.

17. The submersible electromagnetic field generator according to claim 1, further operable to receive an external clock signal, and further comprising a data gathering module, wherein the data gathering module is operable to receive the external clock signal and to time-stamp data gathered by the data gathering module with a time-stamp generated from the external clock signal.

18. An electromagnetic (EM) field generation system for seafloor electromagnetic surveying, comprising:
a submersible electromagnetic (EM) field generator according to claim 1;
a power source operably coupled to the AC to DC converter of the electromagnetic field generator; and
a control module operably coupled to the controller of the submersible electromagnetic field generator, wherein the control module is operable to control the waveform driving signal that drives the antenna.

19. The electromagnetic field generation system according to claim 18, wherein the control module is operably coupled to a global positioning satellite (GPS) receiver, and is further operable to generate a clock signal in synchronisation with a GPS transmitter signal.

20. The electromagnetic field generation system according to claim 19, wherein the control module is operable to supply a data gathering module with the clock signal.

21. The electromagnetic field generation system according to claim 20, wherein the data gathering module is operable to time-stamp gathered data with a time-stamp generated from the clock signal.

22. The electromagnetic field generation system according to claim 18, wherein the control module is operably coupled to the controller of the submersible electromagnetic field generator using a fibre optic cable.

23. A method of generating an electromagnetic (EM) field for seafloor electromagnetic surveying, comprising:
providing an AC signal;
generating first and second DC outputs from the AC signal as positive and negative DC signals on the first and second DC outputs;
generating a waveform driving signal of a desired functional form by selective switching of the positive and negative DC signals using a first switch pair and a second switch pair, each connected in series between the first and second DC outputs, first and second waveform output electrodes being provided at connection points between each switch pair, wherein the waveform driving signal is a tristate waveform driving signal produced by generating a sequence of forward currents, reverse currents and zero currents between the first and second waveform output electrodes; and
driving an electric dipole antenna formed by a pair of antenna electrodes connected to respective ones of the waveform output electrodes with the waveform driving signal to generate the EM field, wherein the antenna electrodes are spaced apart along the length of the antenna and submerged in seawater, wherein said selective switching of the first and second DC signals switches the DC outputs to the antenna to pass a current through the seawater between the antenna electrodes in order to generate the EM field following the desired functional form defined by said selective switching.

24. The method of claim 23, comprising synchronising generation of the waveform driving signal produced at a submersible electromagnetic field generator with a clock signal provided from topside.

25. The method of claim 23, wherein the first and second switch pairs comprise semiconductor switches.

26. The method of claim 25, wherein each semiconductor switch has a transient voltage suppressor connected between its source and gate.

27. The method of claim 25, wherein the semiconductor switches are MOSFETs or IGBTs.

28. The method of claim 23, wherein surge protection circuitry is used to protect against surges, and the surge protection circuitry comprises one or more diodes.

29. The method of claim 28, wherein each of the switches is connected in parallel with a respective one of the diodes.

30. The method of claim 23, wherein surge protection circuitry is used to protect against surges, and the surge protection circuitry comprises a set of transient suppression circuits, each providing suppression tuned to a particular frequency or frequency range.

31. The method of claim 30, wherein the transient suppression circuits have capacitors, diodes and/or resistors with values selected of their respective particular frequency or frequency range.

32. A method for obtaining hydrocarbon from an area that contains a subterranean hydrocarbon reservoir, comprising:
providing survey data from an electromagnetic survey of the area performed using a submersible electromagnetic (EM) field generator comprising:
an AC to DC converter operable to generate first and second DC outputs from an AC input as positive and negative DC signals on the first and second DC outputs;
a switching module operable to generate a tristate waveform driving signal of a desired functional form by selective switching of the first and second DC outputs, the switching module comprising a first switch pair and a second switch pair, each connected in series between the first and second DC outputs, first and second waveform output electrodes being provided at connection points between each switch pair;
an antenna formed by first and second antenna electrodes connected to the first and second waveform output electrodes respectively, wherein the antenna electrodes are spaced apart along the length of the antenna and separated from each other by seawater when submerged, wherein said selective switching of the first and second DC outputs switches the DC outputs to the antenna to pass a current through the seawater between the antenna electrodes in order to generate an EM field in response to the waveform driving signal that follows the desired functional form defined by said selective switching; and
a controller that is operable to control selective switching of the switching module so as to generate the tristate waveform driving signal;
the method further comprising:
analyzing the survey data to identify the subterranean hydrocarbon reservoir;
penetrating the subterranean hydrocarbon reservoir with a hydrocarbon-producing well; and
extracting hydrocarbon from the subterranean hydrocarbon reservoir using the hydrocarbon-producing well.

33. A method of obtaining a results data set representing an area that is thought or is known to contain a subterranean hydrocarbon reservoir, the method comprising:
  performing an electromagnetic survey of the area using a submersible electromagnetic (EM) field generator comprising:
    an AC to DC converter operable to generate first and second DC outputs from an AC input as positive and negative DC signals on the first and second DC outputs;
    a switching module operable to generate a tristate waveform driving signal of a desired functional form by selective switching of the first and second DC outputs, the switching module comprising a first switch pair and a second switch pair, each connected in series between the first and second DC outputs, first and second waveform output electrodes being provided at connection points between each switch pair;
    an antenna formed by first and second antenna electrodes connected to the first and second waveform output electrodes respectively, wherein the antenna electrodes are spaced apart along the length of the antenna and separated from each other by seawater when submerged, wherein said selective switching of the first and second DC outputs switches the DC outputs to the antenna to pass a current through the seawater between the antenna electrodes in order to generate an EM field in response to the waveform driving signal that follows the desired functional form defined by said selective switching; and
    a controller that is operable to control selective switching of the switching module so as to generate the tristate waveform driving signal; and
  generating the results data set based on data obtained during the survey.

34. An electromagnetic (EM) field generation system for seafloor electromagnetic surveying, comprising:
  a submersible electromagnetic (EM) field generator for seafloor electromagnetic surveying, comprising:
    an AC to DC converter operable to generate first and second DC outputs from an AC input as positive and negative DC signals on the first and second DC outputs;
    a switching module operable to generate a tristate waveform driving signal of a desired functional form by selective switching of the first and second DC outputs, the switching module comprising a first switch pair and a second switch pair, each connected in series between the first and second DC outputs, first and second waveform output electrodes being provided at connection points between each switch pair;
    an antenna formed by first and second antenna electrodes connected to the first and second waveform output electrodes respectively, wherein the antenna electrodes are spaced apart along the length of the antenna and separated from each other by seawater when submerged, wherein said selective switching of the first and second DC outputs switches the DC outputs to the antenna to pass a current through the seawater between the antenna electrodes in order to generate an EM field in response to the waveform driving signal that follows the desired functional form defined by said selective switching; and
    a controller that is operable to control selective switching of the switching module so as to generate the waveform driving signal;
  a power source operably coupled to the AC to DC converter of the electromagnetic field generator; and
  a control module operably coupled to the controller of the submersible electromagnetic field generator; wherein the control module is operable to control the waveform driving signal that drives the antenna, wherein the control module is operably coupled to a global positioning satellite (GPS) receiver, and is further operable to generate a clock signal in synchronization with a GPS transmitter signal, and wherein the control module is operable to supply a data gathering module with the clock signal.

35. The electromagnetic field generation system according to claim 34, wherein the data gathering module is operable to time-stamp gathered data with a time-stamp generated from the clock signal.

36. The electromagnetic field generation system according to claim 34, wherein the control module is operably coupled to the controller of the submersible electromagnetic field generator using a fibre optic cable.

* * * * *